Nov. 7, 1961   K. MEISSNER   3,007,502
WOODEN VENEER AND METHOD OF APPLYING SAME TO A BASE
Filed June 3, 1958

INVENTOR
Kurt Meissner
BY George W. Spencer
ATTORNEY

United States Patent Office 3,007,502
Patented Nov. 7, 1961

3,007,502
WOODEN VENEER AND METHOD OF
APPLYING SAME TO A BASE
Kurt Meissner, Berlin, Germany, assignor to Mikroholz
G.m.b.H., Berlin-Neukolln, Germany
Filed June 3, 1958, Ser. No. 739,564
Claims priority, application Germany June 14, 1957
2 Claims. (Cl. 144—317)

The present invention relates to very thinly-cut wooden veneers and to a method of applying the same to a base or backing, for example, a hard fiber board. Veneers of this kind are secured by means known per se to such a base or backing during application of heat and pressure. The surfaces to be joined may be coated with synthetic resin prior to the joining step.

Very thinly-peeled wooden veneers, particularly if they are of a width of more than 39 inches, are difficult to apply, i.e., they tear readily when fed to the press. If this occurs, the operation has to be interrupted and the veneer must either be carefully put together or cut straight adjacent the tearing edge and then be put together. Such procedures are time-consuming while, in many instances, the grains in the veneer are interrupted in an undesirable manner.

It is an object of the present invention to overcome this disadvantage.

It is another object of the invention to adhere tapes or reenforcing strips to the veneer layers close to their edges, then to apply these veneers to the base or backing boards, whereby the reenforcing tapes or strips will be located beyond the edges of the finished boards; thereafter to fix these veneer layers to the boards by application of heat and pressure, and, finally, to trim the edges of said combined veneer-board structure, whereby the extending ends of the veneers including these tapes or strips will be cut off.

It is a further object of the present invention to apply these reenforcing tapes or strips to the veneers in a direction transverse to the grain thereof.

It is a still further object of the invention to glue paper or linen strips as reenforcing tapes to the wooden veneers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
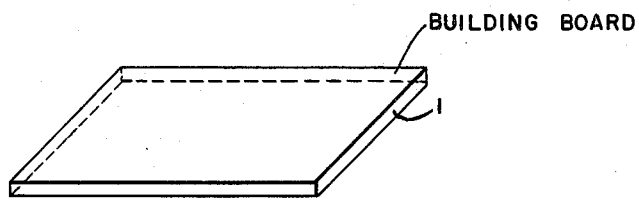
FIGURE 1 is a perspective view of a building board.
Figure 2:
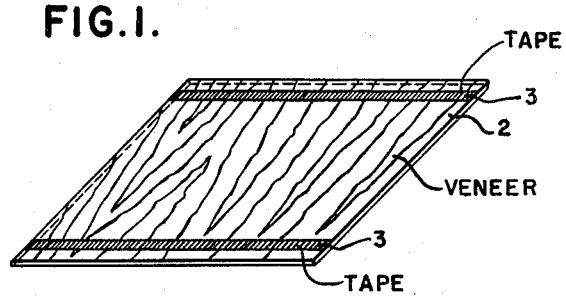
FIGURE 2 is a perspective view of a wooden veneer carrying, at its edges, reenforcing strips according to the present invention.

A building board 1, FIGURE 1, constitutes the base or building board to which a very thinly-peeled wooden veneer 2, FIGURE 2, is to be applied. Reenforcing strips or tapes 3, of paper, linen or other suitable material, are adhered to the wooden veneer 2 close to its edges, these strips or tapes running transversely to the direction of the grain of the veneer so as to prevent tearing of the fibers during the subsequent applying step carried out under heat and pressure in a known manner. The reenforcing strips may have gummed surfaces which are moistened prior to their application to the wooden veneer, or they may be of the Scotch-tape type which does not require such moistening. It is also possible to apply glue to the contacting surface of the tapes and/or of the veneer prior to the gluing of the tapes to the veneer.

Figure 3:
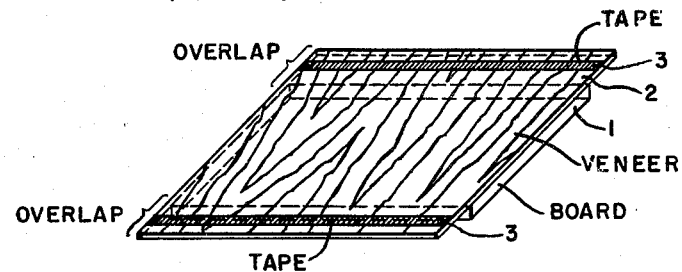
FIGURE 3 is a perspective view of the building board and the veneer after the latter has been applied to the board.
Figure 4:
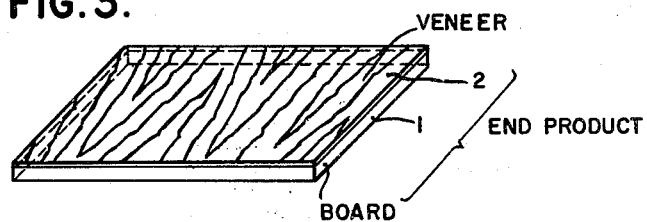
FIGURE 4 is a perspective view of the finished end product after the overlapping edge portions of the veneer, which carry the reenforcing tapes, have been trimmed.

After the veneer 2 has been applied to the board 1, as shown in FIGURE 3, the strips or tapes 3, extending beyond the edges of the board 1, are cut off when the edges of the board with the veneer joined thereto are trimmed, to obtain the end product as shown in FIGURE 4.

I claim:

1. The method of joining a thinly-cut wooden veneer to a base, comprising the steps of adhering a reenforcing tape to said thinly-cut veneer close to at least one of its edges and in a direction transverse to the grain to prevent tearing of said thinly-cut veneer, thereafter placing said thinly-cut veneer onto a base so that a portion of said veneer and said entire reenforcing tape overlap the edges of said base, then applying heat and pressure to the superimposed veneer and base assembly to join said veneer to said base, and finally trimming the overlapping portion of said veneer after said joining step to eliminate the tape.

2. The method of joining a thinly-cut wooden veneer to a base, comprising the steps of adhering a reenforcing tape to said thinly-cut veneer close to at least one of its edges and in a direction transverse to the grain to prevent tearing of said thinly-cut veneer, thereafter placing said thinly-cut veneer onto a base so that a portion of said veneer and said entire reenforcing tape overlap the edges of said base, then bonding the superimposed veneer and base assembly to join said veneer to said base, and finally trimming the overlapping portion of said veneer after said joining step to eliminate the tape.

References Cited in the file of this patent

UNITED STATES PATENTS

| 1,045,529 | Davis | Nov. 12, 1912 |
| 1,977,199 | Osgood | Oct. 16, 1934 |
| 1,997,996 | Carstens | Apr. 16, 1935 |
| 2,412,693 | Pierson | Dec. 17, 1946 |
| 2,522,857 | Buller | Sept. 19, 1950 |
| 2,751,946 | Gramelspacher | June 26, 1956 |

FOREIGN PATENTS

| 418,869 | Great Britain | Nov. 1, 1934 |
| 135,534 | Australia | Nov. 30, 1949 |